United States Patent [19]

Bartholomew et al.

[11] 3,912,481
[45] Oct. 14, 1975

[54] METHOD FOR MAKING ALKALI METAL SILICATE THERMOPLASTIC MATERIALS

[75] Inventors: Roger F. Bartholomew, Painted Post; Harold F. Dates, Corning; Stanley D. Stookey; Walter H. Tarcza, both of Painted Post, all of N.Y.

[73] Assignee: Corning Glass Works, Corning, N.Y.

[22] Filed: Feb. 25, 1974

[21] Appl. No.: 445,453

[52] U.S. Cl.................................. 65/30; 106/74
[51] Int. Cl.² ........................................ C03C 23/00
[58] Field of Search ........ 106/74; 423/334; 65/30 R

[56] References Cited
UNITED STATES PATENTS

| | | | |
|---|---|---|---|
| 3,498,802 | 3/1970 | Bickford et al. | 65/30 R X |
| 3,498,803 | 3/1970 | Stookey | 65/30 R X |
| 3,794,475 | 2/1974 | Lazet et al. | 65/5 |

*Primary Examiner*—Robert L. Lindsay, Jr.
*Attorney, Agent, or Firm*—Clinton S. Janes, Jr.; Clarence R. Patty, Jr.

[57] ABSTRACT

This invention is concerned with the production of inorganic silicate materials which exhibit properties akin to the desirable characteristics of high-polymer organic plastics. Thus, the materials can demonstrate resilience and impact resistance. They are suitable for being thermoplastically formed at relatively low temperatures. They are strong and exhibit relatively good chemical durability, this latter property being capable of further improvement through surface treatments. This invention contemplates hydrating certain alkali metal-containing silicate glasses and thereafter carefully dehydrating the glass to maintain a water content therein within a specified range of concentrations.

24 Claims, 2 Drawing Figures

Fig. 1

Fig. 2

METHOD FOR MAKING ALKALI METAL SILICATE THERMOPLASTIC MATERIALS

The ability to hydrate glasses through contact with steam at elevated temperatures and pressures is known in the art. Thus, U.S. Pat. No. 3,498,803 discloses and discusses in some detail the mechanics involved in hydrating alkali metal silicate glasses and the changes in physical properties exhibited by these glasses as a result of such treatment. Thus, the initial glass was transformed from a hard, brittle material into a plastic or rubbery material.

The glasses disclosed in that patent consisted essentially, in mole percent on the oxide basis, of 6–40% $Na_2O$ and/or $K_2O$ and 60–94% $SiO_2$, the total of those components constituting at least 85 mole percent of the glass. Such compatible metal oxides as PbO, BaO, MgO, $B_2O_3$, $Al_2O_3$, and ZnO could be included. CaO and $Li_2O$ were desireably to be avoided. The glasses were subjected to a gaseous environment containing at least 50% by weight steam at a pressure of at least one atmosphere and a temperature commonly between about 80°–200°C. That treatment was continued for a period of time until at least a surface portion of the glass contained about 5–30% by weight of water within its volume.

U.S. Pat. No. 3,498,802 discloses the production of thermoplastic materials and hydraulic cements through the hydration of alkali metal silicate glass powders consisting essentially, in mole percent on the oxide basis, of 80–94% $SiO_2$ and 6–20% $Na_2O$ and/or $K_2O$, the total of those components constituting at least 90 mole percent of the composition. The compatible metal oxides PbO, BaO, MgO, $B_2O_3$, and ZnO could be present but CaO and $Li_2O$ were again desirably to be avoided. The glass powders were exposed to a gaseous environment containing at least 50% by weight steam at a pressure of at least one atmosphere and a temperature commonly between about 100°–200°C. The steam treatment was conducted for a sufficient length of time to produce at least a surface layer on the glass granules containing up to 30% by weight of water. The hydrated powders were noted as becoming adhesive and cohesive when heated to 80°–120°C. such as to permit pressing, rolling, extrusion, or injection molding at those temperatures.

However, whereas the glass articles produced through the hydration process described in U.S. Pat. No. 3,498,803 did exhibit plastic flow and rubbery behavior and the glass particles hydrated in accordance with U.S. Pat. No. 3,498,802 did demonstrate theremoplastic properties, the chemical durability and resistance to weathering of those products were generally so poor as to foreclose practical utility without some means for protecting the surfaces thereof from the ambient environment. U.S. application Ser. No. 249,289, filed May 1, 1972, now U.S. Pat. No. 3,811,853, describes the manufacture of alkali metal silicate glass articles which will, upon an overt act, self-degrade in the ambient atmosphere. The heart of that invention lies in the hydration of certain $Na_2O$ and/or $K_2O$ silicate glasses and thereafter providing a weathering-resistant surface thereon. The operable glass compositions consist essentially, by weight on the oxide basis, of about 10–30% $Na_2O$ and/or $K_2O$ and 65–90% $SiO_2$, the total of these components constituting at least 80% of the composition. The spontaneous self-degradation commences after the weathering-resistant surface has been penetrated through some overt act to thereby expose a poorly durable interior portion to the ambient environment.

The present invention provides means for forming alkali metal-containing silicate materials which will demonstrate forming characteristics and physical properties approximating or superior to those of high polymer organic plastics but which will also exhibit such good chemical durability and weathering resistance as to impart practical utility thereto. Hence, as employed herein, thermoplastic properties refer to the ability of the material to flow sufficiently at temperatures below those as which conventional glass will flow, viz., temperatures ranging from above the freezing point of water to about 500°C., to permit forming thereof employing methods commonly utilized with organic plastic materials, e.g., dry pressing, extrusion, and injection molding. Such bodies are produced from glass compositions consisting essentially, in mole percent on the oxide basis, of about 3–25% $Na_2O$ and/or $K_2O$ and 55–95% $SiO_2$, the sum of those constituents comprising as least 55 mole percent of the total composition. The addition of such compatible metal oxides as $Al_2O_3$, BaO, $B_2O_3$, CdO, MgO, PbO, and ZnO can be advantageous in improving the melting and forming behavior of the glass or in enhancing the chemical durability thereof. Except for CaO, ZnO, $B_2O_3$, and PbO, which can be included in amounts up to about 25%, MgO which is operable up to 35%, and BaO and $Al_2O_3$ which are useful in amounts up to 20%, it is preferred that individual additions of compatible metal oxides not exceed about 10%. $Li_2O$ appears to inhibit hydration and so will be held below about 5%. CaO frequently produces a translucent or opaque body rather than a transparent body which makes its presence intolerable where a transparent article is desired. Conventional glass colorants such as $Fe_2O_3$, NiO, $Co_2O_3$, CuO, and CdS-Se may also be included in the customary amounts up to a few percent. It should be understood that these latter ingredients can be tolerated in amounts up to about 10% where their function is not limited to their effect as a colorant. The inclusion of 2–3% $P_2O_5$ can yield an opal rather than a transparent glass upon hydration. Finally, where desired, conventional fining agents in the customary amounts can be added.

The method of the instant invention contemplates three general steps. First, a glass having a composition falling within the parameters recited immediately above is produced. Second, the glass is subjected to a gaseous environment at a $H_2O$ pressure of at least about 75% of the value for saturated steam, i.e., at a relative humidity of at least about 75%, and a temperature of at least about 100°C. for a sufficient length of time to develop at least a surface portion within said glass body which is essentially saturated with water. Relative humidities of at least 75% are required to insure progress of the hydration reaction in a practical length of time. The amount of water absorbed by the glass is dependent upon the composition thereof and the relative humidity of the hydrating environment. Hence, in general, the water content will be greater than 15% by weight and can range up to 35% by weight. Certain glasses, however, for example, those containing relatively small amounts of the alkali metal oxides $Na_2O$ and/or $K_2O$ or having a high concentration of heavy molecular oxides will commonly absorb no more than about 10% by weight and, in some instances, even less than 5% by weight. Yet, similar effects on chemical durability, strength, and elastic modulus are observed in those glass compositions absorbing lower amounts of water as are observed in those compositions absorbing greater amounts. The third step comprises reducing the water content of the hydrated glass by exposing the hydrated body to an environment of a lower relative humidity than in the previous step. The dehydration step can improve the chemical durability of the glass, enhance the strength thereof, and improve the thermal, mechanical, optical, and chemical stability of the glass. The dehydration step also has the particularly advantageous feature of permitting the final water content within the glass to be controlled within narrow limits at any level below the saturation water content level. Hence, through control of the temperature and $H_2O$ pressure, a final product having the proper water content to yield a body exhibiting the desired thermoplastic properties can be readily obtained.

It can be recognized that the expression relative humidity is limited in its description of a water-containing atmosphere at very high temperatures. This situation is founded in the fact that the definition of relative humidity necessarily contemplates a level of saturated vapor pressure. Thus, there is a maximum temperature at which any gas can be liquified, this temperature being defined as the critical temperature. Concomitantly, there is a critical pressure, i.e., the pressure demanded to liquefy a gas at the critical temperature. For water, the critical temperature is about 374°C. and the critical pressure is about 3200 psi. Above the critical temperature $H_2O$ has been defined as a fluid which is not considered to be either a liquid or a gas.

Figure 1:
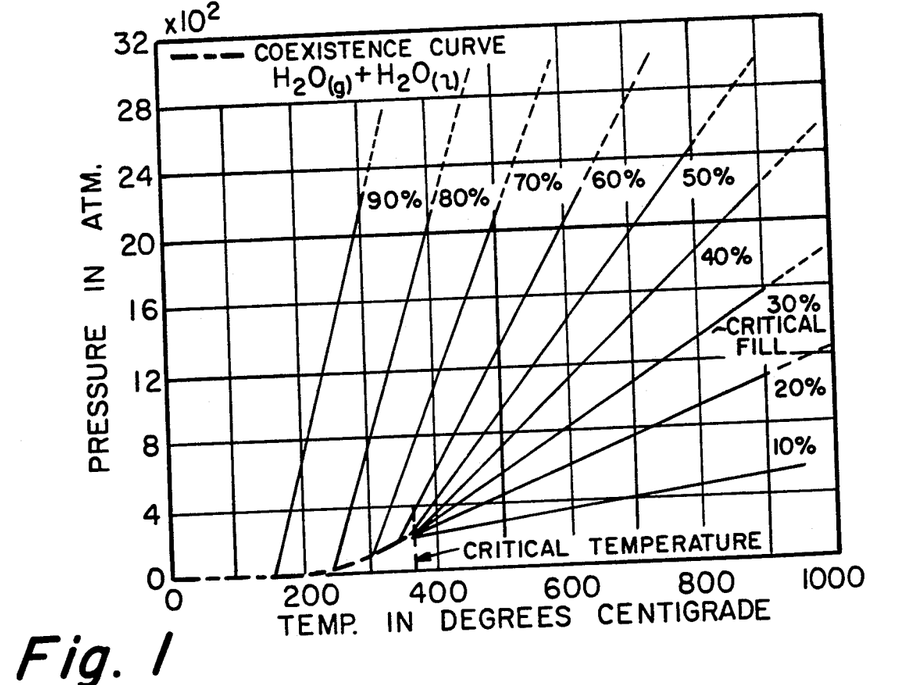
Figure 2:
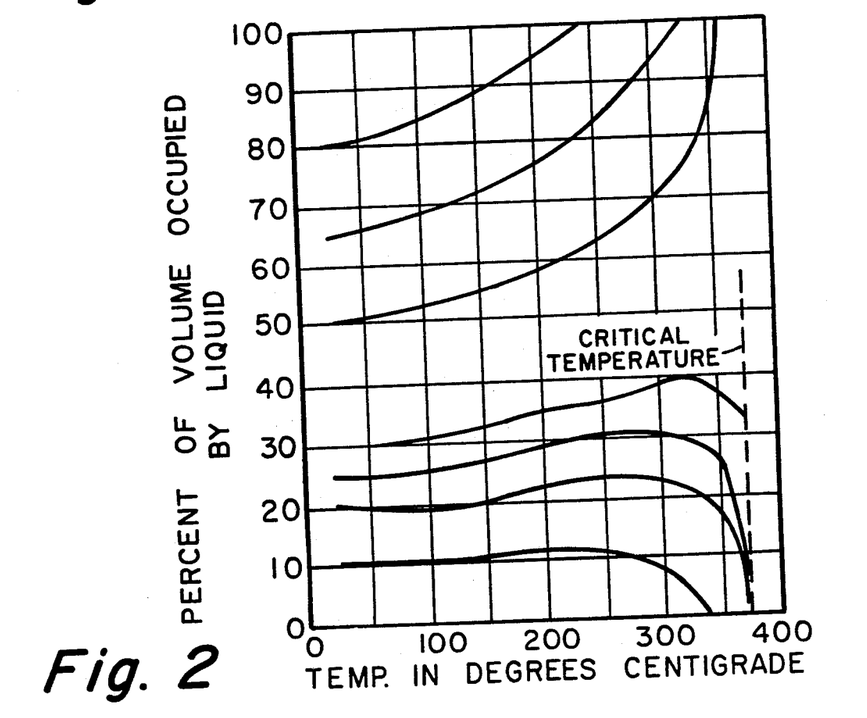

This situation is exemplified in FIG. 1 taken from page 180 of "Hydrothermal Crystal Growth", R. A. Laudise and J. W. Nielsen, *Solid State Physics*, 12, pp. 149–222, Academic Press, New York, 1961, which sets forth pressure-temperature curves for $H_2O$ at constant volume. The straight lines in the drawing depict various filling factors, i.e., the percentage of the volume of the autoclave or other pressure vessel which is filled with liquid $H_2O$ at ambient temperature. The minimum filling factor, i.e., the minimum amount of liquid $H_2O$ which will produce a saturated steam atmosphere (100% relative humidity) can be calculated from standard steam tables. As is pointed out in FIG. 1, this critical filling factor for 374°C. is about 30%. FIG. 1 also illustrates that with filling factors greater than about 30%, the liquid $H_2O$ expands to such an extent that the vessel is filled therewith at temperatures below the critical point, viz., 374°C., such that the vessel is subjected to hydrostatic pressure. This phenomenon is demonstrated in FIG. 2 taken from page 181 of the above-noted literature citation. The curves therein were drawn from the density data of $H_2O$ liquid and gas phases up to the critical temperature and reflect the height of the meniscus in a pressure vessel as a function of temperature at representative fills.

A study of FIG. 1 points out the fact that the pressure-temperature curves at constant fill are substantially linear beyond the coexistence curve (the temperature and pressure limits at which liquid and gaseous $H_2O$ can exist together) and can probably be safely extrapolated. And, inasmuch as the instant invention contemplates treating glass bodies in a gaseous $H_2O$ environment, it is believed apparent that a person of ordinary skill in the art, with FIG. 1 and the standard steam tables before him, could readily determine the necessary filling factor to achieve a desired saturated or less than saturated steam atmosphere at temperatures below 374°C. and, at temperatures above 374°C., could choose a filling factor to achieve any desired pressure at a particular temperature. Since the pressure-temperature curves at constant fill are virtually linear beyond the coexistence curve, one can essentially extrapolate the behavior of the environment from that of an environment of a certain relative humidity below the critical temperature.

Further treatment of critical temperature, filling factor, etc. can be found in such texts as *Steam Tables—Thermodynamic Properties of Water Including Vapor, Liquid, and Solid Phases (English Units)*, J. H. Keenan, F. G. Keyes, P. G. Hill, and J. G. Moore, John Wiley & Sons, New York, 1969 and *Thermodynamic Properties of Steam, Including Data for the Liquid and Solid Phases*, J. H. Keenan and F. G. Keyes. Reference is made to those studies for further explanation of these phenomena.

It is possible to dehydrate the glass of an essentially anhydrous state with an accompanying change in properties. However, the foundation of the instant invention is the inclusion of water within the glass in an effective amount to impart the desired thermoplastic properties thereto. As can be appreciated, higher water contents will normally provide greater plasticity to the glass although certain processes can be conducted where only about 1–2% by weight of water is present. Lower water contents commonly yield a body having better chemical durability which can be advantageous in certain applications. In general, about 3–12% by weight of water insures good plastic-forming properties, the higher values reflecting those compositions absorbing high water contents during the hydration step.

At low relative humidities, a very extended period of time will be demanded to achieve the desired hydration in bulk bodies. Therefore, a high relative humidity and temperature are preferred for the instant invention which will promote rapid diffusion of $H_2O$ into the glass up to the desired level of hydration. The rate of penetration is dependent upon relative humidity, temperature, and composition of the original glass. The water entering the glass acts to expand the glass structure with the consequent effect of making the removal of water therefrom much easier than the original hydration. Further, the use of very low humidities and high temperatures in the dehydration step promotes the rapid loss of water from the glass. Therefore, it is frequently possible to secure glass articles of substantial mass having very low water contents in shorter periods of time utilizing the two-step practice of the present invention than in a single step treatment where low relative humidity environments are employed.

In general, the formation of glass articles displaying thermoplastic properties can be accomplished in four ways. In the first method, an anhydrous glass body of a predetermined configuration is formed by melting a batch of the proper constituents and thereafter simultaneously cooling and shaping the melt. The glass body is then hydrated under high relative humidity, preferably completely through the thickness dimension, to a saturated condition and subsequently dehydrated to a desired water content. After completion of the dehydration step, the body is relatively stable and exhibits a high mechanical strength. The body may then be pulverized to granules or powders which will exhibit thermoplasticity, thereby enabling them to be formed through such processes as hot pressing, molding, or extruding.

In a second method, a glass forming batch of the proper composition is melted and this melt formed into beads or granules in accordance with any conventional practice. Thereafter, these particles are hydrated and then dehydrated in like manner to that described above with respect to bulk glass bodies and then hot formed into plastic-like articles. In a modification of this method, a bulk glass article can be formed from the melt and this article crushed into fine particles prior to the hydration step. Both embodiments of this second method have the advantages of speed and economy, when compared to the above-described first method, inasmuch as the finely-divided glass can be hydrated and subsequently dehydrated more rapidly than a bulk glass body. And, where beads or granules are formed directly from the melt, the expense required for pulverizing the glass body is eliminated.

In a third method, a bulk glass article can be hydrated, dehydrated, and then further shaped into a desired configuration. For example, glass sheets can be hot pressed in this manner into articles of complex configurations.

In a fourth method, glass beads or granules can be hydrated and then shaped into an article of the desired geometry. Thereafter, the article is dehydrated to alter the chemical and physical properties thereof. Since the water content is relatively high after the hydration step, forming of a body is made easy. However, the worker is then faced with the task of dehydrating a bulk shape.

As has been observed above, shaping of the hydrated-dehydrated bulk bodies or particles can be accomplished through forming techniques which are conventional in the plastics-forming art. Injection molding and compression molding have been found to be especially suitable means. Whereas the forming can, in some instances, be conducted at room temperature utilizing very high pressures, the preferred practice involves the use of moderately elevated temperatures, i.e., about 100°–400°C.

Table I presents a group of glass compositions, expressed in mole percent on the oxide basis, which are operable in the instant invention. Batches therefor can be compounded from any materials, either the oxides or other compounds, which, when melted together, are converted into the desired oxide compositions in the proper proportions. The batch ingredients were carefully blended together, a ball mill commonly being employed to assist in securing a homogeneous melt, and then melted in open platinum or silica crucibles for about 16 hours at 1450°–1600°C. It will be appreciated, of course, that larger melts can be made in pots or continuous melting tanks in accordance with conventional glassmaking practice. Thereafter, the melts normally were cooled and shaped into such conventional bulk bodies as hand blown bottles, canes, rods, and slabs which could subsequently, if desired, be crushed into relatively fine particles. In some instances, the melts were immediately transformed into glass beads through such conventional methods as passing a thin stream through a hot flame, or running a stream thereof into water or over patterned rolls.

TABLE I

|  | 1 | 2 | 3 | 4 | 5 | 6 |
|---|---|---|---|---|---|---|
| $SiO_2$ | 71.6% | 77.7% | 77.8% | 78.0% | 76.9% | 78.4% |
| $Na_2O$ | 18.8 | 18.1 | 17.2 | 16.2 | 16.5 | 15.0 |
| ZnO | 7.6 | 2.2 | 3.0 | 3.8 | — | 5.0 |
| $Al_2O_3$ | 1.2 | 1.2 | 1.2 | 1.2 | 2.1 | 1.6 |
| BaO | 0.8 | 0.8 | 0.8 | 0.8 | — | — |
| MgO | — | — | — | — | 4.5 | — |

|  | 7 | 8 | 9 | 10 | 11 | 12 |
|---|---|---|---|---|---|---|
| $SiO_2$ | 78.4% | 78.4% | 78.9% | 79.5% | 80.0% | 80.6% |
| $Na_2O$ | 14.2 | 12.2 | 12.2 | 10.2 | 8.3 | 6.2 |
| ZnO | 5.3 | 7.3 | 5.4 | 5.5 | 5.5 | 5.5 |
| $Al_2O_3$ | 1.3 | 1.3 | 1.3 | 1.3 | 1.3 | 1.3 |
| BaO | 0.8 | 0.8 | 0.9 | 0.9 | 0.9 | 0.9 |
| $K_2O$ | — | — | 1.3 | 2.6 | 4.0 | 5.5 |

|  | 13 | 14 | 15 | 16 | 17 | 18 |
|---|---|---|---|---|---|---|
| $SiO_2$ | 81.2% | 81.8% | 82.0% | 81.9% | 81.8% | 81.7% |
| $Na_2O$ | 4.2 | 2.1 | — | — | — | — |
| ZnO | 5.6 | 5.6 | 4.9 | 5.6 | 6.4 | 7.3 |
| $Al_2O_3$ | 1.3 | 1.3 | 1.3 | 1.3 | 1.3 | 1.3 |
| BaO | 0.9 | 0.9 | — | — | — | — |
| $K_2O$ | 6.8 | 8.3 | 11.8 | 11.2 | 10.5 | 9.7 |

|  | 19 | 20 | 21 | 22 | 23 | 24 |
|---|---|---|---|---|---|---|
| $SiO_2$ | 81.6% | 75.3% | 80.6% | 81.2% | 82.4% | 83.0% |
| $Na_2O$ | — | 17.2 | 17.4 | 16.5 | 14.6 | 13.7 |
| ZnO | 8.0 | 5.4 | — | — | — | — |
| $Al_2O_3$ | 1.3 | 1.3 | — | — | — | — |
| BaO | — | 0.8 | — | — | — | — |
| $K_2O$ | 9.1 | — | — | — | — | — |
| PbO | — | — | 2.0 | 2.3 | 3.0 | 3.3 |

|  | 25 | 26 | 27 | 28 | 29 | 30 |
|---|---|---|---|---|---|---|
| $SiO_2$ | 72.3% | 76.4% | 81.5% | 79.0% | 81.0% | 86.7% |
| $Na_2O$ | 16.0 | 5.2 | — | 8.9 | 13.9 | — |
| $Al_2O_3$ | 0.5 | 0.8 | 2.2 | 2.1 | 2.4 | — |
| $K_2O$ | 0.4 | 6.8 | 4.7 | 5.3 | 1.4 | 7.9 |
| PbO | — | 10.8 | — | — | — | — |
| $B_2O_3$ | 0.7 | — | — | — | — | 5.4 |
| CaO | 5.3 | — | — | — | — | — |
| MgO | 4.8 | — | 11.6 | 4.7 | 1.3 | — |

TABLE I -Continued

|  | 31 | 32 | 33 | 34 | 35 | 36 |
|---|---|---|---|---|---|---|
| $SiO_2$ | 82.8% | 71.6% | 74.6% | 73.2% | 75.8% | 79.9% |
| $Na_2O$ | 11.8 | 19.4 | 25.4 | 18.9 | 14.7 | 13.7 |
| $Al_2O_3$ | 3.0 | 1.2 | — | — | — | — |
| $K_2O$ | 2.1 | — | — | — | — | — |
| CaO | 0.3 | — | — | — | — | — |
| ZnO | — | 7.0 | — | — | — | — |
| BaO | — | 0.8 | — | — | — | — |
| PbO | — | — | — | 7.9 | 10.5 | 15.4 |

|  | 37 | 38 | 39 | 40 | 41 | 42 |
|---|---|---|---|---|---|---|
| $SiO_2$ | 77.2% | 82.3% | 80.3% | 78.3% | 79.0% | 77.2% |
| $Na_2O$ | 12.4 | 11.3 | 11.8 | 12.2 | 13.9 | 14.5 |
| PbO | 10.4 | 6.4 | 8.9 | 9.5 | 8.1 | 8.3 |

|  | 43 | 44 | 45 | 46 | 47 | 48 | 49 |
|---|---|---|---|---|---|---|---|
| $SiO_2$ | 84.1% | 70.9% | 78.6% | 88.8% | 60.0% | 65.0% | 51.8% |
| $Na_2O$ | 11.0 | 4.9 | — | — | 8.0 | 11.0 | 18.8 |
| PbO | 4.9 | 9.5 | 8.8 | 1.2 | — | — | — |
| $K_2O$ | — | — | 12.6 | 10.0 | 8.0 | 8.0 | — |
| BaO | — | — | — | — | 24.0 | — | 15.2 |
| MgO | — | — | — | — | — | 16.0 | — |
| ZnO | — | — | — | — | — | — | 14.2 |

An autoclave is a very useful tool for carrying out the hydration step of the invention. Such an apparatus permits the ready control of steam pressure and temperature and each of the examples reported in Table I was treated in such a device. Hence, the bulk glass articles were more-or-less point supported above the base plate of the autoclave or refractory or TEFLON members. Where glass beads had been formed, these were laid upon TEFLON or other non-adhering and non-reactive material horizontally supported above the floor of the autoclave. After the glass had been positioned properly, the autoclave was sealed and thereafter heated to generate steam at the desired pressure. Normally, steady state operation of the autoclave was achieved in about 30 minutes, although at the highest temperatures and pressures a somewhat longer period was required.

The period of time required to secure a body hydrated completely therethrough or a body having a hydrated layer of a desired thickness will be dependent upon the glass composition as well as the temperature and $H_2O$ pressure within the autoclave. Hence, as a general rule, the glasses containing higher percentages of the alkali metal oxides will hydrate more rapidly. Likewise, higher temperatures and relative humidities commonly lead to more rapid hydration. Although the preferred practice conventionally contemplates hydrating the body completely through the thickness dimension, it can be recognized that gradients in water content can optionally be produced in the body cross section.

Normally, the hydration reaction will be undertaken in a $H_2O$-saturated atmosphere for a sufficient length of time to hydrate the glass completely therethrough, since a saturated atmosphere provides a much faster hydration rate. Thus, depending upon the thickness of the body involved and the temperatures employed, the time therefor can vary from as little as about 0.25 hour up to 96 hours or even more. The time required for hydration at steam contents less than saturation appears to increase at a virtually exponential rate. Hence, at atmospheres wherein the $H_2O$ pressure is less than about 75% of the value for saturated steam, the rate for hydrating samples of any substantial bulk becomes so slow as to approach impracticability. Further, the time-saving inherently resulting from the production of glass beads or granules as a starting material becomes self-evident. Inasmuch as the pressures involved become very high, temperatures less than the critical temperature, viz., about 374°C., will customarily be utilized. Nevertheless, specially designed autoclaves are available for higher temperature use where such is desired. As noted earlier, higher temperatures lead to more rapid hydration.

In general, air will constitute that part of the atmosphere other than steam but various inert gases such as helium, argon, nitrogen, etc. can be introduced.

The maximum temperature at which hydration can be conducted is, for practical purposes, a function of the operating capabilities of the equipment utilized. That factor must be tempered, of course, with the recognition that softening and/or melting of the glass body will preclude the use thereof in certain applications. Therefore, hydration temperatures up to about 600°C. and higher are certainly possible from an equipment point of view. However, where dimensional integrity of the glass body is sought, hydration temperatures below the softening point of the anhydrous or original glass will be employed.

After the glass has been hydrated to the desired degree, the second step of the invention is initiated which can be undertaken in accordance with three differenct practices. In the first and preferred method, the temperature within the autoclave is maintained at a constant value while the relative humidity therein is reduced to a level which is less than 90% of that employed in the hydration step. In the second method, both the temperature and the $H_2O$ pressure within the autoclave are reduced to yield a relative humidity value less than 90% of that utilized in the hydration step. This latter technique yields satisfactory results but requires the careful control of two parameters rather than one. The third method involves raising the temperature while either maintaining, lowering, or even raising the steam pressure but the relative humidity is adjusted to a level less than 90% of that employed in the hydration step. It will be recognized, of course, that modifications in, or combinations of, those three methods are possible. Normally, in each of these methods, the temperature will not be decreased below about 100°C. until after the dehydration step is essentially completed.

Inasmuch as a decrease in $H_2O$ pressure within the autoclave causes water to be expelled from the glass surface, a foamed mass will frequently result if the hydrated glass is in a softened condition, unless special care is exercised in conducting the dehydration step. That is, rapid dehydration of the glass in a softened or viscous condition will customarily lead to the foaming thereof. However, such foamed bodies can have utility as thermal insulating materials and are especially practical due to their inherent nonflammability. The hydrated granules and foamed masses can be shaped into bodies of a desired configuration utilizing standard plastic-forming methods. Similarly to the hydration step, the time for dehydration will vary depending upon glass composition, body dimensions, temperatures, pressures, etc. Generally, dehydration can be accomplished in about 0.25–72 hours. The introduction of such inert gases as air, nitrogen, argon, etc. can be useful in maintaining a higher overall pressure within the autoclave when the partial pressure of steam is reduced. The introduction of acid vapors, such as $SO_2$ or $SO_3$, can have the added utility of enhancing the chemical durability of the glass surface.

This dehydration process will normally be continued until the water content of the glass has been reduced to between about 3–12% by weight. This range of water content permits ready shaping of the material employing conventional plastic-forming equipment at relatively low temperatures while imparting improved chemical durability thereto. After the dehydration step has been concluded, the temperature within the autoclave is allowed to slowly fall below 100°C. to avoid outgassing or bloating of the bulk articles. The hydrated product is thereafter removed from the autoclave.

Where desired, as for example to further improve chemical durability and/or temperature resistance, the body can be further dehydrated after the forming step by subsequent treatment in an autoclave at low relative humidity or simply heating in dry air. The plastic character of the material will thereby be decreased or lost, of course, but the properties of the glass in essentially the anhydrous state can be achieved.

In practicing this second step of the invention, the minimum treatment time required to reduce the water content to a desired value can be determined empirically and will be directly dependent upon such factors as pressure, temperature, and, thus, the relative humidity maintained within the autoclave, besides the more obvious parameters of glass composition and the thickness dimensions of the body involved. It is quite apparent that, like the initial hydration step, the transport of water during the dehydration step will take place more rapidly at higher temperatures. Also, dehydration will commonly occur more rapidly where the $H_2O$ pressure approaches zero, i.e., an environment having a relative humidity of zero. Therefore, the preferred procedure contemplates a $H_2O$ pressure of less than about 100 psi at temperatures above 200°C. with treating times ranging between about 0.25 to 24 hours.

An economically attractive procedure for carrying out the dehydration step involves maintaining the temperature within the autoclave at the value utilized in the prior hydration step while bleeding off the $H_2O$ to some predetermined gauge pressure within the autoclave. The humidity within the apparatus can readily be calculated from the gauge pressure below the critical temperature. This method renders unnecessary the use of specific dwell periods at stated temperatures and gauge pressures and renders unnecessary the sophisticated control equipment required to undertake such a program. Nevertheless, this latter practice yields equally satisfactory products and may be demanded with some glass compositions where cracking and/or foaming of bulk articles pose serious problems.

A measure of the chemical durability of a glass can be determined by immersing samples thereof in water maintained at 70°C. for a period of 20 hours. The loss of $Na_2O$ and/or $K_2O$ and, where present, PbO, from the original samples is then measured. A loss of less than about 100 micrograms/cm$^2$ has been adjudged indicative of a satisfactory durability for most applications.

Table II records times, temperatures, and steam pressures employed in various hydration treatments applied to several of the glass compositions listed in Table I. In each instance, a saturated $H_2O$ atmosphere was initially utilized, with filling factors up to 20% but, normally, 10% or less being employed, and the sample was treated for a sufficient length of time to insure hydration completely through the cross section. The water contents resulting therefrom generally ranged between about 15–25% by weight although the bodies of Example 26 averaged about 10–11% by weight. The bottle samples were hand blown with an average wall thickness of about 0.060–0.120 inch. The bipyramid samples, ⅛ inch from peak to peak, were formed by passing a stream of the molten glass over patterned rolls. The cane, tubing, and ribbon samples were machine drawn.

Table II also reports times and $H_2O$ pressures employed in the dehydration treatments of those examples along with measurements of the water contents remaining and the chemical durability thereof after dehydration, as determined in the above-described test therefor. In each instance, the temperature of the autoclave was held at the level used in the previous hydration step and $H_2O$ removed from the autoclave at a relatively uniform rate to the final gauge pressure recited over the time period specified. The autoclaves employed with the following examples had internal volumes varying between about 7–9 ft$^3$.

It will be recognized that the water content measurements reflect an overall bulk sample and that some gradient in water content can be present between the surface and interior portions of the sample. And, where desired, this gradient in water content can be turned to good practical advantage with regard to the mechanical strength of the glass. Hence, it is possible to achieve a rather sharply defined surface layer wherein the water content is considerably lower than that present in the interior portion. The lower content of water yields a body having a lower coefficient of thermal expansion than a glass of similar composition but having a higher water content. Therefore, when the body cooled to room temperature after the dehydration step, the surface layer containing the lower water content will be under compression resulting in a significant enhancement in mechanical strength being imparted to the article. An example of this type of strength improvement can be observed in the ⅛ inch cane samples of Example 5 reported in Table II. After the hydration-dehydration sequence recorded there, the canes exhibited an average modulus of rupture of about 40,200 psi which is several times greater than the 6000–14,000 psi values measured on annealed cane samples before any treatment was applied thereto and many times greater than the 1210 psi value measured after full hydration wherein the glass contained 27% by weight water.

In certain instances, it is also possible to produce a glass article of greatly increased mechanical strength by developing a surface layer containing crystals. These crystals can have a lower coefficient of thermal expansion than the interior glass which will thereby impart a low expansion to the resulting composite surface layer. The surface layer is then placed under compression in like fashion to the mechanism described above with respect to the water gradient.

It is also possible to greatly enhance the strength of a glass article in which crystals are developed throughout the body thereof. An example of this phenomenon is reported in the two 0.04 inch cane samples of Example 25 wherein, after the treatments set out in Table II, an average modulus of rupture of 79,600 psi was measured on the first samples and 93,400 psi on the second. Here, again, these values are far in excess of annealed cane samples of the original glass. The appearance of crystals results in a translucent-to-opaque final product and some reduction in the plastic properties as exhibited by glasses not containing crystals. X-ray diffraction and light microscope analyses indicated the crystals therein to be tobermorite, a complex calcium silicate-containing phase having a long platy morphology, i.e., a high length-to-width ratio. It can be readily appreciated that, in those applications where transparency is not demanded, these crystal-containing glasses can be very useful and, of course, they can have the additional advantage of increased strength.

TABLE II

| Example No. | Form | Temperature | Hydration Step Pressure | Time | Dehydration Step Pressure | Time | Weight % H$_2$O | Durability Micrograms/cm$^2$ |
|---|---|---|---|---|---|---|---|---|
| 5 | bottle | 222°C. | 380 psig | 88 hours | 15 psig | 6 hours | 8.4 | |
| 5 | bottle | 222°C. | 325 psig | 45 hours | 50 psig | 15 hours | 10.6 | |
| 5 | bottle | 225°C. | 380 psig | 57 hours | 183 psig | 4 hours | 12.5 | |
| 5 | bottle | 222°C. | 340 psig | 36 hours | 10 psig | 16 hours | 9.5 | |
| 5 | bottle | 220°C. | 330 psig | 42 hours | 50 psig | 21 hours | 8.0 | 70 |
| 5 | 1/8" cane | 220°C. | 340 psig | 36 hours | 10 psig | 16 hours | 9.1 | |
| 25 | bottle | 225°C. | 380 psig | 57 hours | 183 psig | 4 hours | 8.9 | |
| 25 | bottle | 222°C. | 340 psig | 36 hours | 10 psig | 16 hours | 6.3 | 80 |
| 25 | 0.04" cane | 222°C. | 350 psig | 42 hours | 0 psig | 5 hours | 9.0 | |
| 25 | 0.04" cane | 222°C. | 350 psig | 12 hours | 0 psig | 3 hours | 9.0 | |
| 27 | bottle | 222°C. | 380 psig | 88 hours | 15 psig | 6 hours | 9.4 | |
| 28 | bottle | 222°C. | 380 psig | 88 hours | 15 psig | 6 hours | 9.5 | |
| 28 | bottle | 222°C. | 325 psig | 45 hours | 50 psig | 15 hours | 8.5 | |
| 29 | bottle | 222°C. | 325 psig | 45 hours | 50 psig | 15 hours | 6.5 | |
| 29 | bottle | 225°C. | 380 psig | 57 hours | 183 psig | 4 hours | 10.5 | |
| 30 | bottle | 225°C. | 380 psig | 57 hours | 183 psig | 4 hours | 12.5 | |
| 31 | bottle | 225°C. | 380 psig | 57 hours | 183 psig | 4 hours | 11.2 | |
| 32 | bipyramids | 242°C. | 560 psig | 48 hours | 0 psig | 10 hours | 6.3 | |
| 32 | bipyramids | 220°C. | 330 psig | 42 hours | 50 psig | 21 hours | 8.7 | |
| 33 | bipyramids | 220°C. | 330 psig | 42 hours | 50 psig | 21 hours | 8.4 | |
| 20 | bipyramids | 220°C. | 330 psig | 42 hours | 50 psig | 21 hours | 8.5 | |
| 8 | 1/8" cane | 215°C. | 330 psig | 70 hours | 0 psig | 15 hours | 8.9 | |
| 6 | 1/8" cane | 215°C. | 300 psig | 70 hours | 0 psig | 15 hours | 8.8 | |
| 7 | 1/8" cane | 215°C. | 300 psig | 70 hours | 0 psig | 15 hours | 8.6 | |
| 26 | −40+70 U.S. Sieve Granules | 225°C. | 320 psig | 17 hours | 0 psig | 14 hours | 4.6 | |
| 26 | −40+70 U.S. Sieve Granules | 230°C. | 400 psig | 15 hours | 275 psig | 5 hours | 6.1 | |
| 26 | −40+70 U.S. Sieve Granules | 230°C. | 405 psig | 14 hours | 300 psig | 4½ hours | 6.8 | |
| 26 | −40+70 U.S. Sieve Granules | 230°C. | 405 psig | 15 hours | 360 psig | 4 hours | 8.5 | |
| 5 | 1/16" × 1/4" Ribbon | 420°C. | 3500 psig | 3 hours | 250 psig | 2 hours | 13.2 | |
| 5 | 1/16" × 1/4" ribbon | 420°C. | 3500 psig | 3 hours | 0 psig | 1 hour | 8.5 | |
| 25 | 3/8" Cane | 420°C. | 3500 psig | 3 hours | 0 psig | 1 hour | 12.8 | |
| 26 | 1/8" I.D. × 1/16" O.D. Tubing | 420°C. | 3500 psig | 3 hours | 0 psig | 1 hour | 2.4 | |

As has been observed above, the chemical durability of these glasses after the dehydration step can be adequate for most practical applications and this is especially true in those compositions containing at least 80 mole percent SiO$_2$ or where the content of oxides other than R$_2$O and SiO$_2$ totals at least 10% by weight. Nevertheless, where it is known that the service environment will be particularly severe, the surface thereof can be fortified against chemical attack through various means. The simplest and most economical methods comprise contacting the surface with vapors containing SO$_2$, SO$_3$, CuCl and/or fluoride at temperatures in the annealing range of the glass. Greater protection can be gained through the replacement of Na$^+$ and K$^+$ in the glass surface with Li$^+$ and/or Cu$^+$ ions. Such an exchange can be accomplished through contacting the glass with a source of Li$^+$ and/or Cu$^+$ ions (commonly a bath of a molten Li$^+$ and/or Cu$^+$ salt) at temperatures in the annealing range and up to the deformation or softening point of the glass. Table III is illustrative of these two practices and compares weight losses in micrograms/cm$^2$ after 20 hours in water at 70°C. between several of the examples prior and subsequent to the surface fortification treatment.

TABLE III

| Ex. No. | Form | Water Content After Dehydration Step | Weight Loss Before Treatment | Fortification Treatment | Weight Loss After Treatment |
|---|---|---|---|---|---|
| 5 | bottle | 7.8% | 189 mg/cm² Na₂O | SO₂ gas at 300°C. for 2 minutes | 60 mg/cm² Na₂O |
| 5 | bottle | 7.8% | 189 mg/cm² Na₂O | SO₂ gas at 170°C. for 2 hours | 55 mg/cm² Na₂O |
| 5 | bottle | 7.8% | 189 mg/cm² Na₂O | SO₂ gas at 190°C. for 1 hour | 30 mg/cm² Na₂O |
| 5 | ⅛" cane | 10.7% | 647 mg/cm² Na₂O | SO₂ gas at 260°C. for 2 hours | 44 mg/cm² Na₂O |
| 5 | ⅛" cane | 10.7% | 647 mg/cm² Na₂O | SO₂ gas at 255°C. for 2 hours plus immersion in a silicone oil for 6 hours at 255°C. | 10 mg/cm² NA₂O |
| 25 | 0.04" cane | 7.9% | 65 mg/cm² Na₂O | Immersion in LiNO₃ bath for 1 minute at 300°C. | 8.6 mg/cm² Na₂O<br>32 mg/cm² Li₂O |
| 25 | 0.04" cane | 7.9% | 65 mg/cm² Na₂O | Immersion in LiNO₃ bath for 15 minutes at 300°C. | 1.0 mg/cm² Na₂O<br>15 mg/cm² Li₂O |
| 25 | 0.04" cane | 7.9% | 65 mg/cm² Na₂O | Immersion in LiNO₃ bath for 1 hour at 300°C. | 1.2 mg/cm² Na₂O<br>18 mg/cm² Li₂O |

In the working examples recited above, the glass was hydrated in an environment of H₂O alone (with air). This practice is not required. For example, as has been observed above, various inert gases such as helium, argon, or nitrogen can constitute part of the atmosphere. Also such acidic gases as CO₂, acetic acid, SO₂, SO₃, H₃PO₄, and HCl can be utilized to dealkalize the glass surface and thereby fortify it against chemical attack. Such latter practice will normally be performed during the dehydration step or on the final product since hydration would be inhibited thereby.

In general, shapes can be formed from masses of glass particles subjected to the hydration-dehydration practice of this invention utilizing techniques conventional in the organic plastics art. For example, treated glass particles passing a No. 5 United States Standard Sieve (4.00 mm) and, preferably, passing a No. 40 United States Standard Sieve (420 microns) can be dry pressed, extruded, and injection molded in the manner of organic thermoplastic materials. Larger-sized particles can, of course, also be employed but at the cost of longer hydrating treatment times to achieve the desired extent of hydration. Each forming operation normally requires the mass of glass particles to be shaped under some pressure and, whereas it is sometimes possible to form shapes at temperatures approaching the freezing point of water, the process is commonly undertaken at somewhat elevated temperatures, e.g., about 100°–400°C., where better flow in the hydrated material can be achieved. A temperature of about 500°C. has been deemed a practical maximum for the glass compositions of this invention.

Inasmuch as some volatilization of the absorbed water can occur at the forming temperature employed, it may be desirable to shape the articles within an autoclave or other pressurized system. Various atmospheres may also be used at suitable pressures to prevent excessive volatilization of water.

Specific instances of forming articles from hydrated-dehydrated glass particles produced according to the method of the instant invention are set out below.

Example I

A stainless steel compression mold was filled with −40+70 United States Standard Sieve mesh granules (420–210 microns) of glass 5 of Table I containing 12% by weight water, and a slight pressure (10–15 psi) applied to the mold. The temperature of the mold was then raised to 180°C, and the pressure thereon increased to 1000 psi. This pressure was maintained while the temperature was raised to 250°C. Thereafter, the mold temperature was lowered to 150°C. before the pressure was released. After cooling the mold to room temperature, a finished, pressed bar having the dimensions ⅛ × ½ × 4 ½ inches was removed from the mold.

Example II

The stainless steel mold utilized in Example I was filled with −40+70 United States Standard Sieve mesh granules of glass 25 of Table I containing 8% by weight of water and a slight pressure (10–50 psi) applied. The temperature of the mold was raised to 250°C. and the pressure thereon increased to 8000 psi. This pressure was continued as the temperature was raised to 350°C. Thereafter, the temperature of the mold was lowered to 150°C. while the pressure was maintained at 8000 psi. The pressure was then released, the mold cooled to room temperature, and a finished pressed bar of the dimensions ⅛ × ½ × 4 ½ inches removed therefrom.

Examples III and IV below report specifid instances of forming bodies of foamed glass utlizing the two-step process of this invention. These examples, in the lime manner to Examples I and II above describing the formation of glass articles utilizing the thermoplastic behavior of the products derived from the present invention, are illustrative only and should not be deemed limiting of the claimed process.

Example III

A TEFLON lined, PRYEX brand dish was filled with −80+140 United States Standard Sieve mesh anhydrous granules (170–105 microns) of glass 26 of Table I and a second TEFLON lined, PYREX brand dish was filled with −200 United States Standard Sieve mesh anhydrous granules (<74 microns) of glass 26 of Table I. Both of the dishes were positioned in an autoclave operating at 250°C. wherein the H₂O pressure ranged between about 400–600 psi. After 12 hours, steam was bled off to yield a pressure within the autoclave of about 100 psi and this pressure was held for four hours while maintaining the temperature at 250°C. Thereafter, the autoclave was cooled to room temperature and the dishes removed. A white foamed body resulted from the −80+140 mesh granules which exhibited a bulk density of about 9 lbs/ft³, whereas the white foamed body made from the −200 mesh material exhibited a bulk density of about 16 lbs/ft³.

Example IV

A TEFLON lined, PYREX brand dish was filled with −40+70 United States Standard Sieve mesh anhydrous granules (420–210 microns) of glass 20 of Table I and placed in an autoclave operating at 230°C. with a H₂O pressure of about 400 psi. After 14 hours, steam was bled off to produce a H₂O pressure within the autoclave of about 100 psi and this pressure maintained for 4 hours while holding the temperature at 230°C. The autoclave was then cooled to room temperature and the dish now containing a white foamed body removed therefrom. The bulk density of the body was about 7 lbs/ft³.

Although in the above description an autoclave was utilized in carrying out the hydration-dehydration step, it will be appreciated that a continuous process can be undertaken employing such apparatus as a tunnel or shuttle kiln or other specially engineered continuously operable hydration unit with appropriate controls for temperature, pressure, and humidity. This practice can be of particular advantage with fine beads or granules where the times for hydrating and dehydrating are relatively brief.

We Claim:

1. A method for making a glass body exhibiting thermoplastic properties which comprises the steps of:
   a. hydrating a glass body consisting essentially, in mole percent on the oxide basis, of about 3–25% $Na_2O$ and/or $K_2O$ and 50–95% $SiO_2$, the sum of those constituents constituting at least 55% of the total composition, by exposing said body to a $H_2O$-containing gaseous environment having a relative humidity of at least about 75% at a temperature of at least about 100°C. for a period of time sufficient to develop at least a surface portion which is essentially saturated with water; and, thereafter,
   b. dehydrating said body through contact thereof with a gaseous environment wherein the relative humidity is less than about 90% of that employed in said hydration step for a period of time sufficient to reduce the water content at least within said surface portion but leaving an effective amount therein to impart the desired thermoplastic properties thereto.

2. A method according to claim 1 wherein said glass body is hydrated through exposure to a $H_2O$-containing gaseous environment fully saturated with steam.

3. A method according to claim 1 wherein said glass body is hydrated through exposure to a temperature between about 100°C. and the softening point of the glass body.

4. A method according to claim 1 wherein said glass body is hydrated through exposure for a period of time ranging between about 0.25–96 hours.

5. A method according to claim 1 wherein said hydrated glass body has at least a surface portion containing about 5–35% by weight of water.

6. A method according to claim 1 wherein said glass body is dehydrated through contact with a gaseous environment having a relative humidity of about 0–90% of that employed in said hydration step.

7. A method according to claim 1 wherein said glass body is dehydrated through contact with a gaseous environment having a $H_2O$ pressure of less than 100 psi and a temperature higher than 200°C.

8. A method according to claim 6 wherein said gaseous environment contains acidic vapors to enhance the chemical durability of the glass.

9. A method according to claim 1 wherein said glass is dehydrated through contact with said gaseous environment for a period of time ranging between about 0.25–72 hours.

10. A method according to claim 1 wherein said glass body is dehydrated at a temperature approximating that of the initial exposure but at a relative humidity reduced to less than about 90% of that employed in said hydration step.

11. A method according to claim 1 wherein said glass body is dehydrated at a temperature lower than that of the initial exposure and also a reduced $H_2O$ pressure to yield a relative humidity less than about 90% of that utilized in said hydration step.

12. A method according to claim 1 wherein said glass body is dehydrated at a temperature higher than that of the initial exposure and also maintaining, raising, or lowering the $H_2O$ pressure but wherein the relative humidity is reduced to less than about 90% of that employed in said hydration step.

13. A method according to claim 1 wherein said dehydrated glass body has at least a surface portion containing at least about 1% by weight water.

14. A method according to claim 1 wherein said dehydrated glass body has at least a surface portion containing about 3–12% by weight water.

15. A method according to claim 1 wherein said surface portion has a lower water content than the interior portion such that said surface portion will have a lower coefficient of thermal expansion than said interior portion whereby, when said glass body is cooled to room temperature, said surface portion will be under compression.

16. A method according to claim 1 wherein crystals are developed within said surface portion having a coefficient of thermal expansion lower than that of the interior portion of the glass body whereby, when said glass body is cooled to room temperature, said surface portion will be under compression.

17. A method according to claim 1 wherein crystals having a long platy morphology are developed throughout said glass body whereby the mechanical strength of the body is enhanced and the appearance thereof is rendered translucent-to-opaque.

18. A method for forming bulk shapes from glass particles made in accordance with claim 1 exhibitng thermoplastic properties in which comprise the steps of:
   a. sizing said glass particles to pass a No. 5 United States Standard Sieve;
   b. forming a mass of said particles to a shape of a desired configuration under pressure and at a temperature ranging from above the freezing point of water to about 500°C., and then
   c. bringing said shape to room temperature.

19. A method according to claim 18 wherein said glass particles pass a No. 40 United States Standard Sieve.

20. A method according to claim 18 wherein said mass of particles is formed at temperatures between about 100°–400°C.

21. A method according to claim 18 wherein during or after said forming step at least a surface portion of said shape is dehydrated to an essentially anhydrous state.

22. A method for making a foamed glass body which comprises the steps of:
   a. hydrating a glass body consisting essentially, in mole percent on the oxide basis, of about 3–25% $Na_2O$ and/or $K_2O$ and 50–95% $SiO_2$, the sum of those constituents at least 55% of the total composition, by exposing said body to a $H_2O$-containing gaseous environment having a relative humidity of at least about 75% at a temperature at which the hydrated glass is in a softened condition for a period of time sufficient to develop at least a surface portion which is essentially saturated with water; and, thereafter;

b. rapidly dehydrating said body in a softened condition through contact thereof with a gaseous environment wherein the relative humidity is less than about 90% of that employed in said hydration step for a period of time sufficient to reduce the water content at least within said surface portion.

23. A method according to claim 22 wherein said glass body is hydrated through exposure to a $H_2O$-containing gaseous environment fully saturated with steam.

24. A method according to claim 22 wherein said glass body is dehydrated through contact with a gaseous environment having a relative humidity of about 0–90% of that employed in said hydration step.

* * * * *

UNITED STATES PATENT OFFICE
CERTIFICATE OF CORRECTION

PATENT NO. : 3,912,481

DATED : February 25, 1974

INVENTOR(S) : Roger F. Bartholomew, Harold F. Dates, Stanley D. Stookey, and Walter H. Tarcza It is certified that error appears in the above-identified patent and that said Letters Patent are hereby corrected as shown below:

Column 14, Table III, under heading Weight Loss After Treatment, line 5, "NA$_2$O" should be -- Na$_2$O --.

Column 14, line 32, "specifid" should be -- specific --.

Column 16, Claim 22, line 64, after "constituents" insert -- constituting --.

*Signed and Sealed this*

*thirteenth* Day of *April 1976*

[SEAL]

Attest:

RUTH C. MASON
*Attesting Officer*

C. MARSHALL DANN
*Commissioner of Patents and Trademarks*